United States Patent
Mandle

(10) Patent No.: US 8,884,808 B2
(45) Date of Patent: Nov. 11, 2014

(54) SYSTEM AND METHOD FOR DETECTING AND DETERMINING REMOTE ATMOSPHERIC ANOMALIES

(75) Inventor: Jacques Mandle, Saint Péray (FR)

(73) Assignee: Thales, Neuilly sur Seine (FR)

( * ) Notice: Subject to any disclaimer, the term of this patent is extended or adjusted under 35 U.S.C. 154(b) by 592 days.

(21) Appl. No.: 13/147,788

(22) PCT Filed: Feb. 1, 2010

(86) PCT No.: PCT/EP2010/051187
§ 371 (c)(1),
(2), (4) Date: Aug. 18, 2011

(87) PCT Pub. No.: WO2010/089278
PCT Pub. Date: Aug. 12, 2010

(65) Prior Publication Data
US 2011/0291879 A1 Dec. 1, 2011

(30) Foreign Application Priority Data

Feb. 6, 2009 (FR) ..................................... 09 00527

(51) Int. Cl.
*G01S 13/00* (2006.01)
*G06F 19/00* (2011.01)
*G01W 1/00* (2006.01)
*G01P 5/26* (2006.01)
*G01S 17/95* (2006.01)

(52) U.S. Cl.
CPC .. *G01P 5/26* (2013.01); *G01W 1/00* (2013.01); *G01S 17/95* (2013.01)
USPC ........................... 342/26 B; 342/26 R; 701/14

(58) Field of Classification Search
CPC ..... G01S 13/953; G01S 13/951; G01S 13/95; G01S 13/50; G01S 13/88; G01S 7/2923; G01S 13/58; G01S 13/956; G01W 1/00; G01W 1/02; G01W 1/08; G01W 1/10; G01W 1/06; G01P 13/025
USPC .... 342/26 R, 26 A, 26 B, 26 C, 26 D; 701/14
See application file for complete search history.

(56) References Cited

U.S. PATENT DOCUMENTS 4,043,194 A * 8/1977 Tanner ......................... 73/178 T
4,575,238 A * 3/1986 Knuhtsen et al. ............ 356/28.5

(Continued)

FOREIGN PATENT DOCUMENTS

FR      2870942 A1    12/2005
GB      2176965 A      1/1987

OTHER PUBLICATIONS

Soreide D et al.: "Coherent Lidar Turbulence Measurement for Gust Load Alleviation," NASA Technical Memorandum, Scientific and Technical Information, Hanover, MD, US, No. 104318, Aug. 1, 1996, p. Complete18, XP002313356.

*Primary Examiner* — Peter Bythrow
(74) *Attorney, Agent, or Firm* — Baker & Hostetler LLP

(57) ABSTRACT

A system for detecting and determining remote atmospheric anomalies is furnished with a movable-beam anemometry probe for measuring the orthogonal projection onto the sighting axis, named the radial component, of a relative velocity remotely, with respect to a remote air mass by Doppler frequency shift. The system comprises means for determining wind heterogeneities remotely, on the basis of at least two successive measurements, at one and the same remote point, of the radial component of the relative velocity of the system with respect to the remote air mass, by said anemometry probe, the line of sight of said anemometry probe comprising said remote point during said successive measurements.

11 Claims, 2 Drawing Sheets

(56) References Cited

U.S. PATENT DOCUMENTS

| | | | |
|---|---|---|---|
| 4,589,070 A * | 5/1986 | Kyrazis | 701/14 |
| 4,652,122 A * | 3/1987 | Zincone et al. | 356/28.5 |
| 4,937,571 A * | 6/1990 | Bonafe | 340/968 |
| 4,965,573 A * | 10/1990 | Gallagher et al. | 340/968 |
| 5,262,782 A * | 11/1993 | Rubin et al. | 342/26 D |
| 5,311,183 A * | 5/1994 | Mathews et al. | 342/26 B |
| 5,359,330 A * | 10/1994 | Rubin et al. | 342/26 D |
| 5,539,409 A * | 7/1996 | Mathews et al. | 342/26 B |
| 5,639,964 A * | 6/1997 | Djorup | 73/170.12 |
| 5,648,604 A * | 7/1997 | Morbieu | 73/181 |
| 6,480,142 B1 * | 11/2002 | Rubin | 342/26 R |
| 6,535,158 B2 * | 3/2003 | Wilkerson et al. | 342/26 D |
| 7,471,214 B2 * | 12/2008 | Feyereisen et al. | 340/949 |
| 7,499,181 B2 * | 3/2009 | Mirand et al. | 356/519 |
| 2002/0005798 A1 * | 1/2002 | Wada et al. | 342/26 |
| 2003/0009268 A1 * | 1/2003 | Inokuchi | 701/14 |
| 2004/0027570 A1 * | 2/2004 | Caldwell et al. | 356/338 |
| 2004/0036630 A1 * | 2/2004 | Jamieson et al. | 340/962 |
| 2004/0036852 A1 * | 2/2004 | Bruel et al. | 356/28.5 |
| 2007/0022807 A1 * | 2/2007 | Miller et al. | 73/170.02 |
| 2007/0063887 A1 * | 3/2007 | Chaure et al. | 342/26 R |
| 2007/0069941 A1 * | 3/2007 | Pearlman et al. | 342/26 B |
| 2007/0236367 A1 * | 10/2007 | Matayoshi et al. | 340/973 |
| 2008/0043234 A1 * | 2/2008 | Mirand et al. | 356/342 |
| 2008/0291082 A1 * | 11/2008 | Kemkemian | 342/26 B |
| 2009/0033911 A1 * | 2/2009 | Lacondemine et al. | 356/28 |
| 2009/0051896 A1 * | 2/2009 | Caldwell et al. | 356/28 |
| 2010/0134780 A1 * | 6/2010 | Rodeau et al. | 356/28.5 |
| 2010/0277715 A1 * | 11/2010 | Caldwell et al. | 356/28.5 |
| 2010/0280767 A1 * | 11/2010 | Caldwell et al. | 702/50 |

* cited by examiner

SYSTEM AND METHOD FOR DETECTING AND DETERMINING REMOTE ATMOSPHERIC ANOMALIES

CROSS-REFERENCE TO RELATED APPLICATIONS

This application is a National Stage of International patent application PCT/EP2010/051187, filed Feb. 1, 2010, which claims priority to foreign French patent application No. FR 0900527, filed Feb. 6, 2009, the disclosures of which are incorporated by reference in their entirety.

FIELD OF THE INVENTION

The invention pertains to a system and a method for detecting and determining remote atmospheric anomalies, and to an aircraft carrying such a system onboard.

BACKGROUND

Systems carried onboard aircraft for detecting turbulence in advance and thus avoiding deleterious consequences to the aircraft or to its occupants are known.

Turbulence is manifested as sudden local variations in wind velocity and direction, which are the cause of haphazard and uncontrolled movements of airplanes. Indeed, the movements of air with respect to the ground, or, stated otherwise, with respect to the Terrestrial reference frame, that are also referred to as the wind, are not homogeneous. In particular, spatial wind heterogeneities create increments of angle of attack or sideslip which generate movements of the airplane.

The avoidance by the aircraft of a risk zone assumes identification and location of a turbulence zone with sufficient notice to re-schedule the trajectory of the aircraft, with agreement of the air traffic control, i.e. typically 5 minutes at the minimum.

Entry into such a risk zone requires flight control actions in preparation for crossing the zone.

Among these consequences, the most frequent relates to bodily accidents involving persons aboard the aircraft. These accidents may be caused by abrupt unexpected accelerations or rotations of the aircraft when it crosses a zone of turbulence. These accelerations may give rise, on the one hand, to impacts between persons and the walls of the aircraft, for example against the ceiling of the passenger cabin when the persons are not strapped into their seat, and on the other hand, the striking of persons by objects that are not securely fixed to the structure of the aircraft, for example service trolleys. The cost of these accidents is high.

Much more rarely, the crossing of a zone of turbulence by an aircraft may damage its structure, notably when intense winds are present in the zone of turbulence.

The vertically directed wind components have an influence on the angle of attack, therefore on the lift of the aircraft, and the laterally directed components have a yaw influence on the aircraft through the changes in sideslip on the tailfin.

The detection of these wind heterogeneities can make it possible either to prepare the aircraft to confront these difficulties by taking rapid actions, or to trigger an avoidance maneuver so as to sidestep the danger zone.

SUMMARY OF THE INVENTION

An aim of the invention is to propose a system for detecting and characterizing remote atmospheric anomalies which is cheap and of improved reliability.

There is proposed, according to one aspect of the invention, a system for detecting and determining remote atmospheric anomalies, furnished with a movable-beam anemometry probe for measuring the orthogonal projection onto the sighting axis, named the radial component, of a relative velocity remotely with respect to a remote air mass, for example, by Doppler frequency shift. The system comprises, furthermore, means for determining wind heterogeneities remotely, on the basis of at least two successive measurements, at one and the same remote point, of the radial component of the relative velocity of the system with respect to the remote air mass, by said anemometry probe, the line of sight of said anemometry probe comprising said remote point during said successive measurements.

Such a system makes it possible, in a simple and cheap manner, to detect remote wind heterogeneities, so as to be able to react in advance.

According to one embodiment, the system comprises means for measuring a local relative velocity with respect to a local air mass, and the means for determining wind heterogeneities remotely comprise means for estimating a vector representative of atmospheric anomalies, equal to the vector sum of said local relative velocity and of an aerological disturbance.

Thus, it is possible to obtain an estimation of the variations in angle of attack or in sideslip that will be encountered by the aircraft so as to counter them by suitable deflection of the airfoils.

In one embodiment, said means for estimating the vector representative of atmospheric anomalies are suitable for solving the following equations in two variables:

$$\begin{cases} V_{r1} = V^* \cdot \sin(\varphi - \theta_1) \\ V_{r2} = V^* \cdot \sin(\varphi - \theta_2) \end{cases}$$

in which:

$V_{r1}$, $V_{r2}$ represent the two successive measurements, at one and the same remote point, of the radial component of the relative velocity of the system with respect to the remote air mass;

$\theta_1$, $\theta_2$ represent the respective angles between the direction of displacement of the system and the sighting axis of the anemometry probe during said two successive measurements;

$V^*$ is said vector representative of atmospheric anomalies; and $\varphi$ represents the angle between the axis perpendicular to the direction of displacement of the system, passing through said remote measurement point, and said vector representative of atmospheric anomalies.

Such calculations limit system memory use.

According to one embodiment, the system comprises, furthermore, alarm means, means for comparing the values of said parameter representative of atmospheric anomalies and of said local relative velocity, and means for activating the alarm means when said values of said parameter representative of atmospheric anomalies and of said local relative velocity are different.

Through a simple comparison of two values, an alarm may be triggered so as to forewarn the user, in particular the pilot of an aircraft when the system is onboard.

In one embodiment, the duration separating the two successive radial measurements is less than 2 seconds.

Thus, it is possible to obtain an estimation of the variations in angle of attack or in sideslip that will be encountered by the airplane so as to counter them by suitable deflection of the airfoils.

For example, said anemometry probe is a probe based on electromagnetic waves.

Such a probe is often present on aircraft, and may be used by the present system, so as to limit the cost of the system.

For example, said anemometry probe is a laser-based optical probe.

The use of an anemometry probe based on laser waves, or LIDAR, allows the system to operate accurately, even in clear or dry air, and not to be hindered by spurious echoes in proximity to the ground.

For example, said anemometry probe is furnished with an orientable platform or with a movable mirror suitable for modifying the line of sight and for rendering the beam movable.

Thus an anemometry probe whose line of sight passes through the measurement point during the successive measurements is obtained cheaply.

In one embodiment, said means for measuring a local relative velocity comprise a Pitot probe, a static pressure probe, and an air temperature probe, which are situated on the external surface of the aircraft.

Such elements for measuring a relative velocity with respect to the local air are cheap, reliable and widespread.

The invention also pertains to an aircraft comprising an onboard system as claimed in one of the preceding claims.

According to another aspect of the invention, there is also proposed a method for detecting and determining remote atmospheric anomalies, in which wind heterogeneities are determined remotely, on the basis of at least two successive measurements, at one and the same remote point, of the radial component of the relative velocity of the system with respect to the remote air mass, by an anemometry probe, the line of sight of said anemometry probe comprising said remote point during said successive measurements.

BRIEF DESCRIPTION OF THE DRAWINGS

The invention will be better understood on studying a few embodiments described by way of wholly non-limiting examples and illustrated by the appended drawings in which.

DETAILED DESCRIPTION

In the description which follows, the system for detecting and determining remote atmospheric anomalies, according to one aspect of the invention, is described as carried onboard an aircraft, but this is a wholly non-limiting example.

Figure 1:
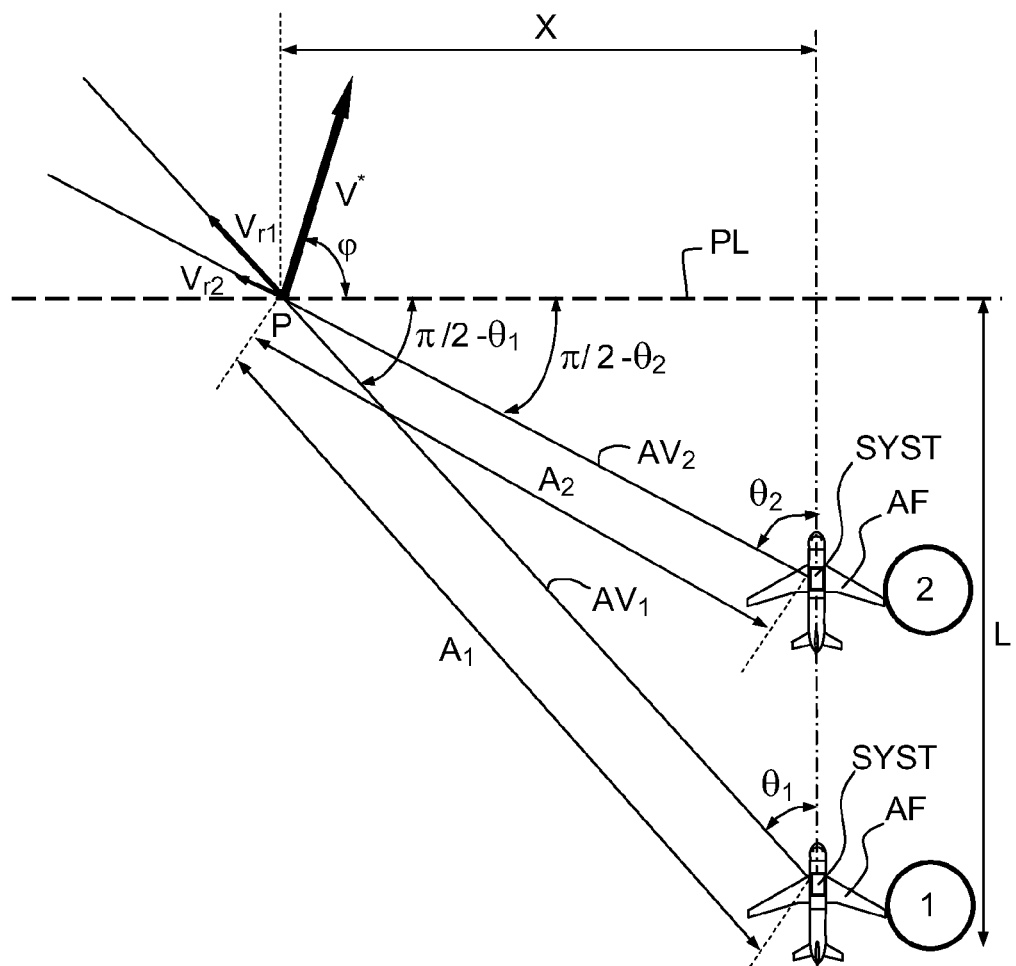
FIG. 1 illustrates schematically an embodiment of a system according to one aspect of the invention, carried onboard an airplane.
Figure 2:
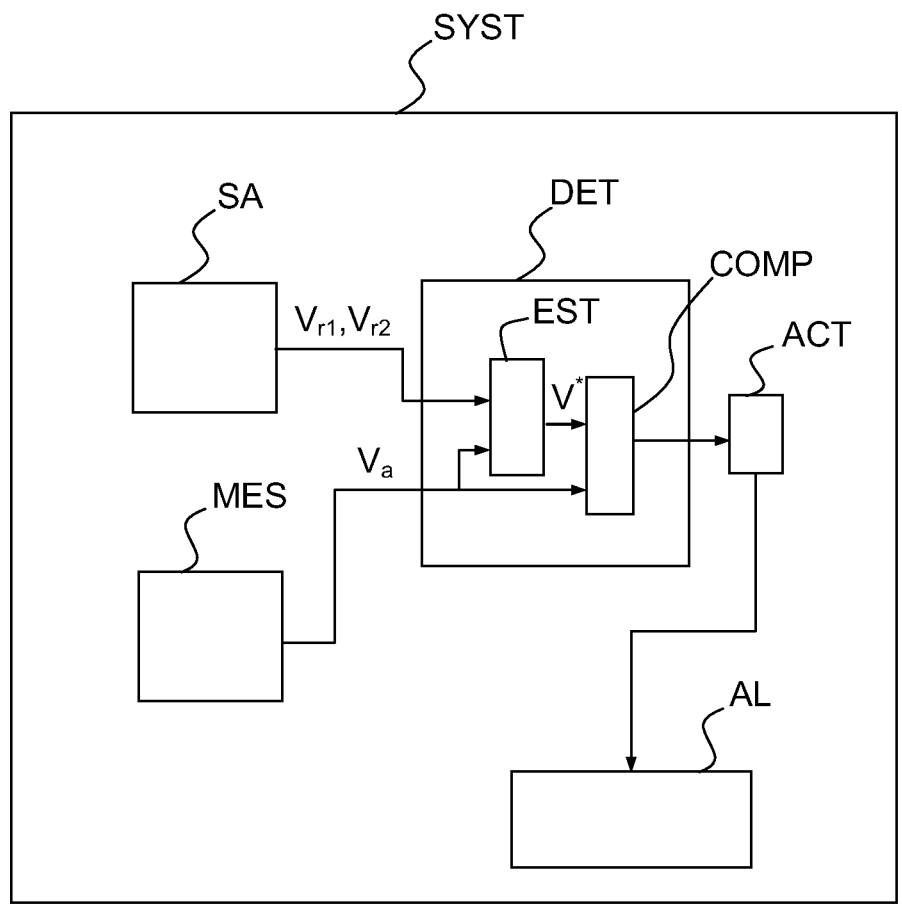
FIG. 2 illustrates in greater detail a system according to one aspect of the invention.

Such as illustrated in FIGS. 1 and 2, a system for detecting and determining remote atmospheric anomalies according to the invention is mounted aboard an aircraft in FIG. 1.

The system SYST comprises a module DET for determining wind heterogeneities remotely, on the basis of at least two successive measurements $V_{r1}$, $V_{r2}$, at one and the same remote point P, of the radial component of the relative velocity of the system with respect to the remote air mass, by said anemometry probe SA.

The line of sight $AV_1$, $AV_2$ of the anemometry probe SA comprises, or passes through, said remote point P during the successive measurements of the radial components $V_{r1}$, $V_{r2}$. For this purpose, the anemometry probe SA may be furnished with an orientable platform or with a movable mirror for modifying the line of sight and rendering the beam movable. Thus, the beam of the probe SA may be movable in terms of elevation and azimuth.

The system SYST is furnished with a module MES for measuring a local relative velocity $V_a$ with respect to a local air mass.

The module DET for determining wind heterogeneities remotely comprises a module EST for estimating a vector V* representative of atmospheric anomalies, equal to the vector sum of said local relative velocity $V_a$ and of an aerological disturbance PA.

The system SYST also comprises an alarm module AL, such as an audible or visual element, a module COMP for comparing the values of the parameter V* representative of atmospheric anomalies and of the local relative velocity $V_a$, as well as a module ACT for activating the alarm means AL when said values of the parameter V* representative of atmospheric anomalies and of the local relative velocity $V_a$ are different.

Thus, when the system is carried onboard an aircraft, the pilot, or the control center may be warned in advance of the presence of a risk zone.

The estimation module EST is suitable for solving the following equations in two variables V*, φ:

$$\begin{cases} V_{r1} = V^* \cdot \sin(\varphi - \theta_1) \\ V_{r2} = V^* \cdot \sin(\varphi - \theta_2) \end{cases}$$

in which:

$V_{r1}$, $V_{r2}$ represent the two successive measurements, at one and the same remote point, of the radial component $V_{r1}$, $V_{r2}$ of the relative velocity of the system SYST with respect to the remote air mass;

$\theta_1$, $\theta_2$ represent the respective angles between the direction of displacement of the system and the sighting axis of the anemometry probe during said two successive measurements $V_{r1}$, $V_{r2}$;

V* is said vector representative of atmospheric anomalies; and

φ represents the angle between the axis perpendicular to the direction of displacement of the system, passing through said remote measurement point, and said vector V* representative of atmospheric anomalies.

Indeed, it is sought to characterize an atmospheric anomaly by the vector V*.

V* is in fact the vector sum of the aerological disturbance or the wind disturbance to be identified, which is liable to bring about unforeseen movements of the aircraft in case this disturbance should be encountered, and of the local velocity of the airplane $V_a$ with respect to the air. If V* is equal to $V_a$, this signifies that the anomaly is zero, and that no turbulence is detected.

From the aircraft situated a distance L from a plane PL perpendicular to the estimated trajectory, a first measurement is made at a first distance $A_1$ at a point P situated a distance X from this estimated trajectory. This measurement point P is seen at an angle $\theta_1$. At this point, the anemometry probe SA performs the first measurement of the radial component $V_{r1}$ of the relative velocity of the system SYST, or of the aircraft AF aboard which the latter is carried, with respect to the remote air mass along the sighting axis $AV_1$ of the anemometry probe SA. The radial component is the projection of V* onto the sighting axis $AV_1$. At a subsequent instant, the anemometry probe SA performs the second measurement of the radial component $V_{r2}$ of the relative velocity of the system SYST, or of the aircraft AF aboard which the latter is carried, with respect to the remote air mass along the sighting axis $AV_2$ of the anemometry probe SA. The radial component is the projection of V* onto the sighting axis $AV_2$.

The angle between the vector V* and the plane perpendicular to the estimated trajectory is denoted φ. The estimated trajectory of the system SYST or of the aircraft AF carrying the system SYST is the straight line extending the vector of the local relative velocity $V_a$ with respect to the air of the aircraft AF. A conventional relation for modeling aircraft flight is used: the attitude of the aircraft or airplane AF is equal to the sum of the slope of the trajectory and of the angle of attack of the aircraft. The attitude is provided by an attitude calculation facility (A.H.R.S., Attitude and Heading Reference System) or an inertial facility (I.R.S., Inertial Reference System) of the aircraft, together with the slope of the trajectory, and the angle of attack is provided by an anemometric facility (Air Data System).

In FIG. 1, the aircraft AF furnished with the system SYST for detecting remote atmospheric anomalies is represented in two successive positions referenced 1 and 2. The distance separating these two successive positions 1 and 2 is obviously proportional to the local relative velocity $V_a$ of the aircraft AF with respect to the air, $V_a$ and to the time interval dt. The local relative velocity $V_a$ of the aircraft AF with respect to the air is assumed constant over the time interval dt. The time interval dt is preferably less than two seconds.

The same measurement point P is then seen at an angle $\theta_2=\theta_1+d\theta_1$ and the anemometry probe SA measures the two radial components $V_{r1}, V_{r2}$ along the two sighting axes $AV_1$ and $AV_2$ at the two successive instants, of the vector V*, considered to be constant over the time interval dt.

Given that the following equality holds for any radial component $V_r$ of a measurement of the anemometry probe SA, by orthogonal projection of the vector V* onto the current sighting axis:

$$V_r = V^* \cdot \cos(\pi/2 - \theta + \phi) = V^* \cdot \sin(\phi - \theta)$$

This therefore yields the following system of two equations in two unknowns V*, φ:

$$\begin{cases} V_{r1} = V^* \cdot \sin(\varphi - \theta_1) \\ V_{r2} = V^* \cdot \sin(\varphi - \theta_2) \end{cases}$$

These two equations in two unknowns make it possible to estimate V* and φ, $\theta_1$ and $\theta_2$ being known as being the two measurement angles at the two instants.

By vector subtraction of the local relative velocity $V_a$, by the comparison module COMP, an estimate of the aerological disturbance is obtained. If the vector V* has varied between these two very close measurement instants, even very slightly, the activation module ACT can activate the alarm module AL so as to forewarn of the danger, in particular if this zone is not point-like, that is to say if the same behavior is detected on points neighboring the point P. The same process may be applied to other points in space, at one and the same time in the measurement plane PL situated at the distance L from the first position 1 of the aircraft AF scanned by the anemometry probe SA with the aid of the displacement in elevation and in bearing of the sighting axis, and in other parallel and more remote planes in the case of the use of a remote measurements probe SA the distance of which can be varied by modifying the focusing distance and/or by using a pulsed system. It is thus possible to chart a map of the aerological disturbances liable to affect the aircraft.

It is preferably possible to use an anemometry probe SA of laser-based optical probe type, the advantage of which is to operate perfectly in clear or perfectly pure air, and avoids the influence of spurious echoes in proximity to the ground.

As a variant, the anemometry probe SA may be a probe based on electromagnetic waves.

The present invention makes it possible, cheaply and with improved reliability, to detect remote atmospheric anomalies.

The invention claimed is:

1. A system for detecting and determining remote atmospheric anomalies, furnished with a movable-beam anemometry probe for measuring an orthogonal projection onto a sighting axis, the orthogonal projection being a radial component, of a relative velocity remotely, with respect to a remote air mass by Doppler frequency shift, comprising:
   means for determining wind heterogeneities remotely, based on at least two successive measurements, at one and the same remote point, of the radial component of the relative velocity of the system with respect to the remote air mass, by the anemometry probe, the sighting axis of the anemometry probe comprising the remote point during the successive measurements.

2. The system of claim 1, further comprising means for measuring a local relative velocity with respect to a local air mass, in which the means for determining wind heterogeneities remotely comprise means for estimating a vector representative of atmospheric anomalies, equal to a vector sum of the local relative velocity and of an aerological disturbance.

3. The system of claim 2, wherein the means for estimating the vector representative of atmospheric anomalies are suitable for solving the following equations in two variables (V*, φ):

$$\begin{cases} V_{r1} = V^* \cdot \sin(\varphi - \theta_1) \\ V_{r2} = V^* \cdot \sin(\varphi - \theta_2) \end{cases}$$

wherein:
   $V_{r1}, V_{r2}$ represent the two successive measurements, at the one and the same remote point, of the radial component of the relative velocity of the system with respect to the remote air mass;
   $\theta_1, \theta_2$ represent respective angles between a direction of displacement of the system and the sighting axis of the anemometry probe during the two successive measurements;
   V* is the vector representative of atmospheric anomalies; and
   φ represents an angle between the axis perpendicular to the direction of displacement of the system, passing through the remote measurement point, and the vector representative of atmospheric anomalies.

4. The system of claim 2, further comprising:
   alarm means;
   means for comparing values of the parameter representative of atmospheric anomalies and the local relative velocity; and
   means for activating the alarm means when the values of the parameter representative of atmospheric anomalies and the local relative velocity are different.

5. The system of claim 1, wherein a duration separating the two successive radial measurements is less than two seconds.

6. The system of claim 1, wherein the anemometry probe is a probe based on electromagnetic waves.

7. The system of claim 1, wherein the anemometry probe is a probe based on laser waves.

8. The system of claim 1, wherein the anemometry probe is furnished with an orientable platform or with a movable mirror, suitable for modifying the sighting axis and for rendering the beam movable.

9. The system claim 2, wherein the means for measuring the local relative velocity comprise a Pitot probe, a static pressure probe, and an air temperature probe, which are situated on an external surface of an aircraft.

10. An aircraft comprising an onboard system of to claim 1.

11. A method for detecting and determining remote atmospheric anomalies, comprising:
 determining wind heterogeneities remotely using an electronic computer processor, based on at least two successive measurements, at one remote point, of a radial component of a relative velocity of a system with respect to a remote air mass, by an anemometry probe, a sighting axis of the anemometry probe comprising the remote point during the successive measurements.

\* \* \* \* \*